(12) United States Patent
Géraud et al.

(10) Patent No.: US 12,153,706 B2
(45) Date of Patent: Nov. 26, 2024

(54) METHOD AND DEVICE FOR PROTECTING DATA ENTERED BY MEANS OF A NON-SECURE USER INTERFACE

(71) Applicant: BANKS AND ACQUIRERS INTERNATIONAL HOLDING, Paris (FR)

(72) Inventors: Rémi Géraud, Valence (FR); Pierre Quentin, Enghien les Bains (FR); Mamoudou Sylla, Paris (FR)

(73) Assignee: BANKS AND ACQUIRERS INTERNATIONAL HOLDING, Paris (FR)

( * ) Notice: Subject to any disclaimer, the term of this patent is extended or adjusted under 35 U.S.C. 154(b) by 694 days.

(21) Appl. No.: 17/286,137

(22) PCT Filed: Oct. 16, 2019

(86) PCT No.: PCT/EP2019/078035
§ 371 (c)(1),
(2) Date: Apr. 16, 2021

(87) PCT Pub. No.: WO2020/079045
PCT Pub. Date: Apr. 23, 2020

(65) Prior Publication Data
US 2021/0383017 A1 Dec. 9, 2021

(30) Foreign Application Priority Data
Oct. 18, 2018 (FR) .................................. 1859627

(51) Int. Cl.
*G06F 21/62* (2013.01)
*G06F 3/0488* (2022.01)
(Continued)

(52) U.S. Cl.
CPC ........ *G06F 21/6245* (2013.01); *G06F 3/0488* (2013.01); *G06Q 20/4012* (2013.01); *G06Q 20/3221* (2013.01); *G06Q 20/326* (2020.05)

(58) Field of Classification Search
CPC .............. G06F 21/6245; G06F 3/0488; G06Q 20/4012; G06Q 20/3221; G06Q 20/326;
(Continued)

(56) References Cited

U.S. PATENT DOCUMENTS

| | | | |
|---|---|---|---|
| 2003/0123664 A1* | 7/2003 | Pedlow, Jr. | ........ H04N 21/4623 380/218 |
| 2004/0158703 A1* | 8/2004 | Lund | ........................ H04L 9/12 713/150 |

(Continued)

FOREIGN PATENT DOCUMENTS

| | | |
|---|---|---|
| EP | 2270713 A2 | 1/2011 |
| EP | 2270713 A3 | 8/2014 |

(Continued)

OTHER PUBLICATIONS

English translation of the Written Opinion of the International Searching Authority dated Apr. 14, 2021 for corresponding International Application No. PCT/EP2019/078035, filed Oct. 16, 2019.

(Continued)

*Primary Examiner* — Mohammad W Reza
(74) *Attorney, Agent, or Firm* — David D. Brush; Westman, Champlin & Koehler, P.A.

(57) ABSTRACT

In the field of payment terminals, a new generation of feature-rich payment terminals is emerging. These payment terminals are mass-produced and the level of security provided for data entry operations is low because the primary function of these communication terminals is not the entry of sensitive data. As a result, the data relating to payment transactions entered via these payment terminals are entered (Continued)

Figure 1:
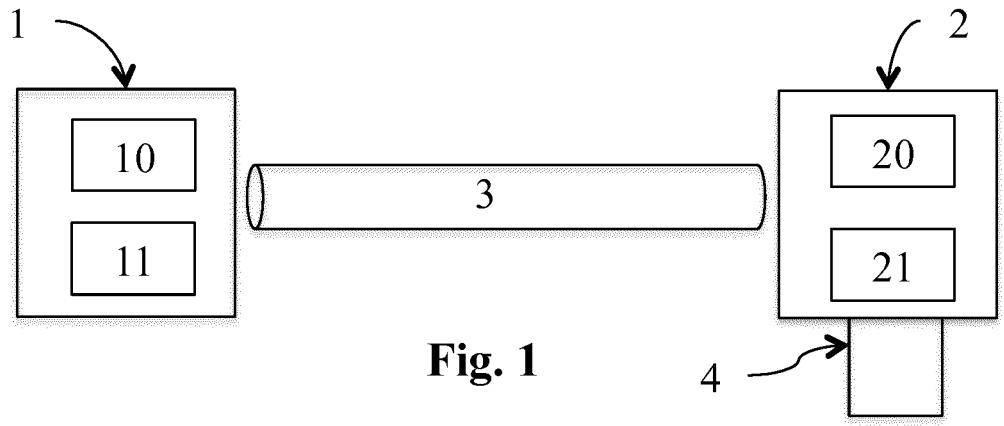

with a level of security that is not adequate as regards the sensitivity of the data entered. Accordingly, a communication terminal is provided, which secures data entered via a user interface of a communication terminal, by transmitting them among a stream of dummy data, and by encrypting all data, those actually entered by a user and the dummy data, before the transmission thereof to a secure data processing device.

7 Claims, 2 Drawing Sheets

(51) Int. Cl.
  *G06Q 20/32* (2012.01)
  *G06Q 20/40* (2012.01)
(58) Field of Classification Search
  CPC .......................... H04L 63/123; H04L 63/1466; H04L 63/0435
  See application file for complete search history.

(56) References Cited

U.S. PATENT DOCUMENTS

2008/0137841 A1* 6/2008 Jajodia .................. H04L 9/0894
  380/28
2018/0121369 A1   5/2018 Poeppelmann et al.

FOREIGN PATENT DOCUMENTS

EP         3007093 A1    4/2016
WO    WO-2016190910 A2 * 12/2016 ............. G06F 21/32

OTHER PUBLICATIONS

International Search Report and Written Opinion dated Dec. 11, 2019 for corresponding International Application No. PCT/EP2019/078035, filed Oct. 16, 2019.
French Search Report and Written Opinion dated May 23, 2019 for corresponding French Application No. FR1859627, filed Oct. 18, 2018.

* cited by examiner

METHOD AND DEVICE FOR PROTECTING DATA ENTERED BY MEANS OF A NON-SECURE USER INTERFACE

CROSS-REFERENCE TO RELATED APPLICATIONS

This Application is a Section 371 National Stage Application of International Application No. PCT/EP2019/078035, filed Oct. 16, 2019, which is incorporated by reference in its entirety and published as WO 2020/079045 A1 on Apr. 23, 2020, not in English.

FIELD OF THE INVENTION

The field of the invention is that of securing sensitive data entered via a communication terminal, the integrity whereof is not guaranteed, with a view to being processed by a secure processing device.

PRIOR ART AND THE DRAWBACKS THEREOF

In the field of payment terminals, a new generation of modular, feature-rich payment terminals is emerging. Such payment terminals, known as smart terminals, can take the form of a touch-sensitive tablet that accepts various means of payment and offers the business services required to manage a business. Since such a tablet has an inbuilt operating system, such as the Android™ operating system for example, business applications such as billing applications for example, as well as conventional applications, can be easily and quickly integrated into such smart payment terminals, thus enhancing the retailer's experience.

Numerous data relating to payment transactions entered via a user interface of these payment terminals are sensitive and it is important that this entry is made with a high level of security.

However, such smart payment terminals are usually mass-produced communication terminals or COTS (commercial off-the-shelf) terminals, for which the level of security provided for data entry operations is low because the primary function of these communication terminals is not the entry of sensitive data.

As a result, the data relating to payment transactions entered via a user interface of these payment terminals are entered with a level of security that is not adequate as regards the sensitivity of the data entered.

There is thus a need to provide a method for entering data using communication equipment that offers a level of security adapted to the level of sensitivity of the data entered.

DESCRIPTION OF THE INVENTION

The invention meets this need by providing a method for protecting data entered via a user interface of a communication terminal, the method being implemented by a secure data processing device and comprising:
 a step of transmitting an encryption table to a module for processing the entered data comprised in the communication terminal, said encryption table being intended to be used to encrypt a first data set actually entered via the user interface and a plurality of second data sets, the entry whereof is intended to be emulated by the user interface,
 a phase of transmitting, to the user interface, said plurality of second data sets, during which the data of the first data set are actually entered via the user interface,
 a step of decrypting the first data set and the plurality of second data sets transmitted by the module for processing the entered data.

The solution of the invention allows the data entered via the user interface of a communication terminal, of the smartphone type for example, to be secured by masking the data entered, such as a PIN code associated with a payment card or an access code to a banking application, by transmitting them among a stream of dummy data, and by encrypting all the data, the data actually entered by a user and the dummy data, before the transmission thereof to a secure data processing device.

Such a solution enables sensitive data to be protected against several types of malicious attacks. More specifically, in order to access the data entered, it is first necessary to determine, among all the data entered, those whose entry via the user interface is an actual entry and those whose entry via the user interface is an emulated entry, and then, in a second step, the data thus isolated must be decrypted.

In one embodiment of the protection method, a new encryption table is transmitted to said module for processing the entered data prior to each phase of transmitting said plurality of second data sets.

Thus, in the event that a first look-up table is corrupted, the data entry via the user interface of the communication terminal remains secure since a new look-up table is used to encrypt the data intended to be entered.

In one embodiment of the protection method, the phase of transmitting said plurality of second data sets is stopped once the first data set has been decrypted.

Thus, in the event of an entry error by the user of the communication terminal, the secure processing device continues to transmit second data sets in order to mask the user's new attempt to enter the first data set.

In one embodiment of the protection method, the processing module determines the content intended to be displayed by the user interface for data entry.

The secure processing device in particular determines areas of the user interface of the communication terminal that correspond to the different digits of a numeric keypad. In such a configuration, neither the operating system of the communication terminal, nor the application requesting data entry via the user interface controls the content that is displayed by the user interface. Thus, an ill-intentioned person who has taken control of the operating system of the communication terminal or of a running application would not be able to obtain information concerning the positioning of areas corresponding, for example, to characters on an alphanumeric keyboard used to enter data. In the absence of such information, the ill-intentioned person is then unable to determine the data actually entered via the user interface.

In one embodiment of the protection method, the processing module communicates with at least one secure device using the data of the first data set.

In one embodiment of the protection method, the secure device is a payment card and the data of the first data set are a PIN code associated with said payment card.

In such an embodiment, the secure processing device is, for example, a secure contactless payment card reader using, for example, an NFC connection to exchange data with the payment card. The data actually entered correspond to the PIN code associated with the payment card and are entered via the communication terminal, which has established a secure communication session with the secure processing device.

The invention further relates to a method for securely transmitting data entered via a user interface of a communication terminal to a secure data processing device, the method being implemented by a module for processing the entered data comprised in the communication terminal and comprising:

a step of receiving an encryption table from the secure processing device, a phase of receiving, from the user interface, a group of data sets comprising a first data set actually entered via the user interface and a plurality of second data sets, the entry whereof has been emulated by the user interface, a step of encrypting, via said encryption table, all of the data sets received, a step of transmitting all of the encrypted data sets to the secure processing device.

In one embodiment of the secure transmission method, upon receiving a message confirming the decryption of the first data set from the secure processing device, the method comprises a step of establishing communication with a processing server.

The invention further relates to a device for securely processing data entered via a user interface of a communication terminal, the processing device comprising at least one processor configured to:

transmit an encryption table to a module for processing the entered data comprised in the communication terminal, said encryption table being intended to be used to encrypt a first data set actually entered by means of the user interface and a plurality of second data sets, the entry whereof is intended to be emulated by the user interface, transmit, during a phase in which the data of the first data set are actually entered via the user interface, said plurality of second data sets to the user interface, decrypt the first data set and the plurality of second data sets transmitted by the module for processing the entered data.

Such a secure processing device is, for example, a contactless payment card reader.

The invention further relates to a module for processing data entered via a user interface of a communication terminal, said module for processing the entered data being comprised in the communication terminal and comprising means for:

receiving an encryption table from the secure processing device, receiving, from the user interface, a group of data sets comprising a first data set actually entered via the user interface and a plurality of second data sets, the entry whereof has been emulated by the user interface, encrypting, via said encryption table, all of the data sets received, transmitting all of the encrypted data sets to the secure processing device.

Such a module for processing the entered data is, for example, a software module embedded in a communication terminal.

Finally, the invention relates to a communication terminal comprising:

a user interface adapted for entering data, and a module for processing the entered data comprising means for:

receiving an encryption table from the secure processing device, receiving, from the user interface, a group of data sets comprising a first data set actually entered via the user interface and a plurality of second data sets, the entry whereof has been emulated by the user interface, encrypting, via said encryption table, all of the data sets received, transmitting all of the encrypted data sets to the secure processing device.

In one specific embodiment, the communication terminal further comprises a device for securely processing the data entered via the user interface of the communication terminal, the processing device comprising at least one processor configured to:

transmit the encryption table to the module for processing the entered data, transmit, during a phase in which the data of the first data set are actually entered via the user interface, said plurality of second data sets to the user interface, decrypt the first data set and the plurality of second data sets transmitted by the module for processing the entered data.

In one specific embodiment of the communication terminal, the user interface consists of a touch screen.

The invention further relates to computer program products comprising program code instructions for implementing methods as described hereinabove, when they are executed by a processor.

The invention further relates to a computer-readable recording medium on which is recorded at least one computer program comprising program code instructions for executing the steps of at least one of the methods according to the invention as described hereinabove.

Such a recording medium can be any entity or device capable of storing the one or more programs. For example, the medium can include a storage means, such as a ROM, for example a CD-ROM or a microelectronic circuit ROM, or even a magnetic recording means, for example a USB stick or a hard drive.

On the other hand, such a recording medium can be a transmittable medium such as an electric or optical signal, which can be carried via an electric or optical cable, by radio, or by other means, such that the one or more computer programs contained therein can be executed remotely. The programs according to the invention can in particular be downloaded from a network, for example the Internet network.

Alternatively, the recording medium can be an integrated circuit into which the one or more programs are incorporated, the circuit being suitable for executing or for use in the execution of the one or more aforementioned methods.

LIST OF FIGURES

Figure 3:
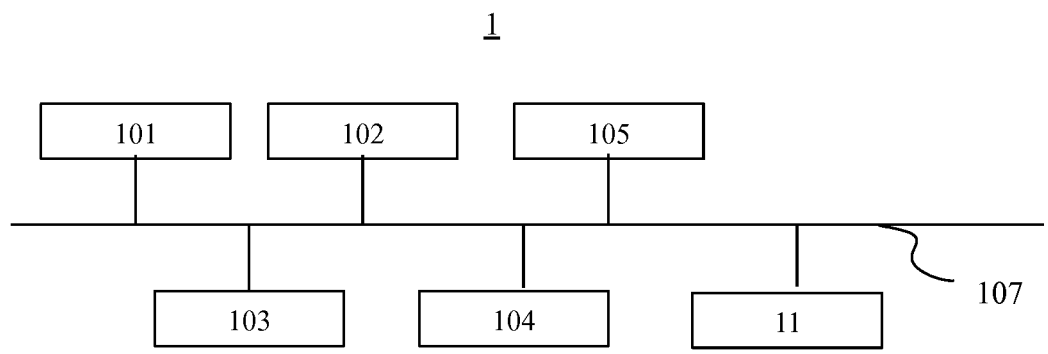
Figure 4:
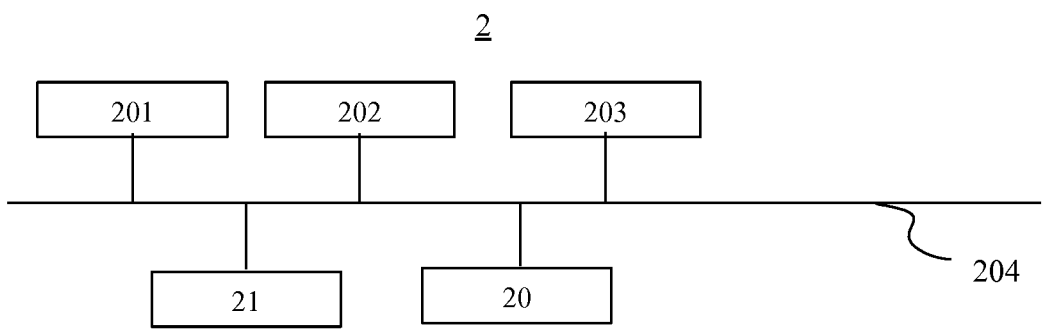
Figure 2:
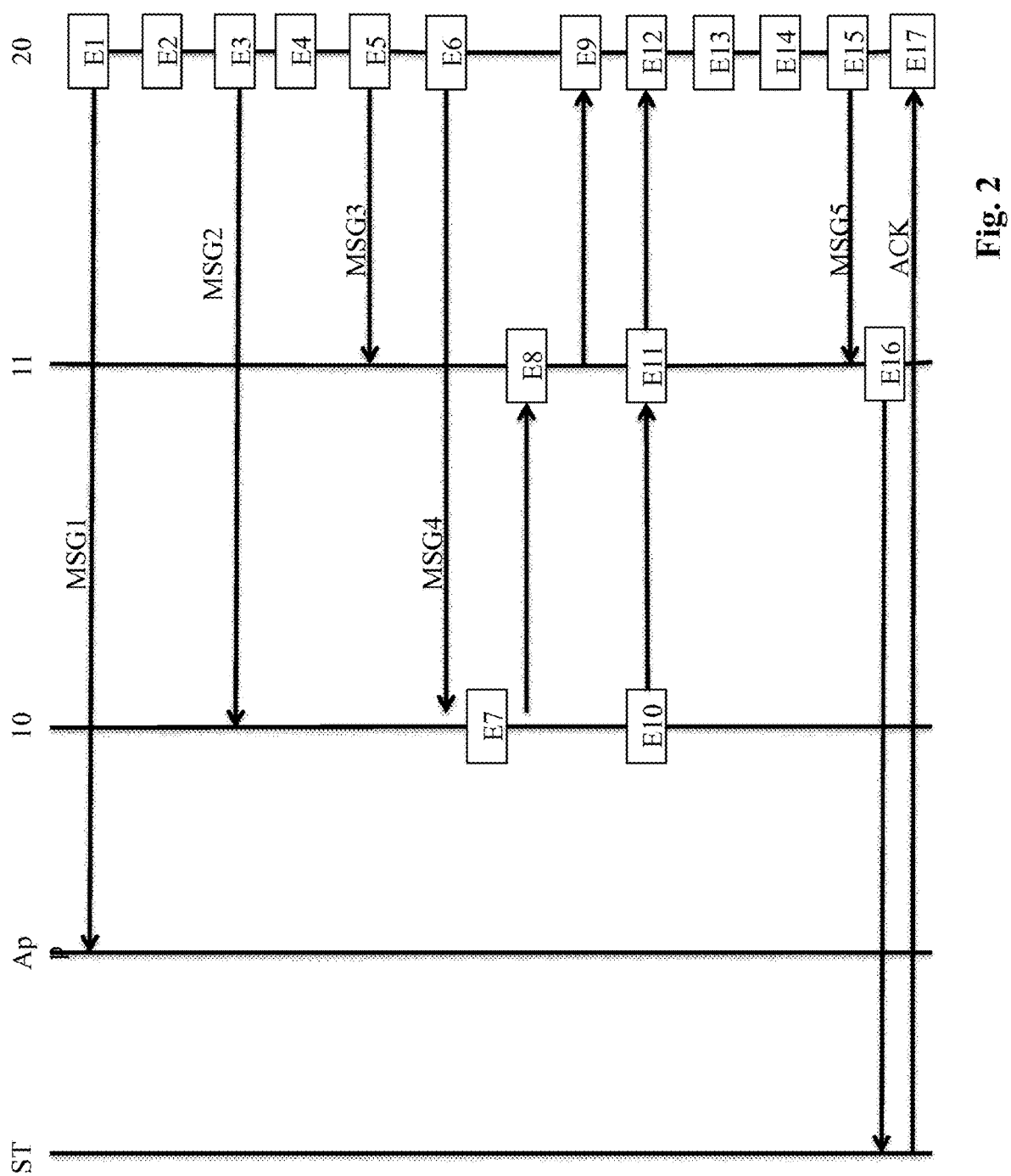

Other purposes, features and advantages of the invention will be better understood upon reading the following description, which is given as a rough guide and in no way as a limited guide, with reference to the accompanying figures, in which:

FIG. 1 shows a system wherein the present invention can be implemented according to a first embodiment, FIG. 2 shows the steps implemented when executing the secure data entry methods according to one embodiment of the invention, FIG. 3 shows a piece of communication equipment according to one embodiment of the invention, FIG. 4 shows a secure data processing device 2 according to one embodiment of the invention.

DETAILED DESCRIPTION OF THE EMBODIMENTS OF THE INVENTION

FIG. 1 shows a system wherein the present invention can be implemented according to a first embodiment.

Such a system comprises a communication terminal 1, such as a tablet or a smartphone, connected via a secure connection 3 to a secure data processing device 2, such as a payment card reader.

The communication terminal 1 in particular comprises a user interface 10 and a module 11 for processing the entered data. The user interface 10 can, in one embodiment of the invention, consist of an alphanumeric keyboard and a screen. In another embodiment of the invention, the user interface 10 can be a touch screen.

The secure connection 3 can be a wired connection established using an Ethernet cable or a wireless near-field connection of the Bluetooth® or NFC (Near Field Communication) type.

The secure data processing device 2 comprises a secure data processing module 20 and a payment card reader 21. In a first implementation, the payment card reader 21 is a secure contactless card reader using, for example, an NFC connection to exchange data with the payment card 4. When the payment card 4 is close enough to the contactless payment card reader, a secure near-field connection is established between the contactless payment card reader and the payment card 4.

In a second implementation, the payment card reader 21 is an integrated circuit card reader into which a payment card 4 is inserted. Once the payment card 4 has been inserted into the integrated circuit card reader, a connection is established between the payment card 4 and the reader heads of the integrated circuit card reader allowing data to be exchanged between the integrated circuit card reader and the payment card 4.

In a second embodiment, the secure data processing module 20 can be embedded in the communication terminal 1.

FIG. 2 shows the steps implemented when executing the secure data entry and transmission methods according to one embodiment of the invention.

For example, in a step E1, the establishment of a connection between a payment card 4 and the payment card reading module 21 triggers the output, by the secure data processing module 20, of a request MSG1 for activating an application installed on the communication terminal 1 and requiring the entry of sensitive data, such as a payment application.

In a step E2, the secure data processing module 20 determines the content of the running application intended to be displayed by the user interface 10 for data entry. Thus, when the user interface is a touch screen for example, the secure data processing module 20 determines the position on the touch screen of areas corresponding to the digits on a numeric keypad. An area corresponding to the same digit is never displayed in the same position on the touch screen.

In a step E3, the secure processing module 20 outputs a message MSG2 to the user interface 10 comprising instructions for the content to be displayed determined in step E2.

In a step E4, the secure processing module 20 generates an encryption table TC intended to be used by the module 11 for processing the entered data to encrypt the data entered via the user interface 10.

In a step E5, the secure processing module 20 transmits the encryption table TC generated in step E4 to the module 11 for processing the entered data in a message MSG3.

In a step E6, the secure data processing module 20 outputs a message MSG4 to the user interface 10, comprising a data set JD1, the entry whereof is intended to be emulated by the user interface 10.

In a step E7, the user interface 10 emulates the entry of the data set JD1, and transmits the data set JD1 whose entry was emulated to the module 11 for processing the entered data.

Upon receiving the data set JD1, the module 11 for processing the entered data encrypts the data set JD1 using the encryption table TC in a step E8.

The encrypted data set CJD1 is then transmitted to the secure processing module 20 in a step E9.

Steps E6 to E9 are repeated at random time intervals during a phase PH1, the duration whereof is variable.

In a step E10, a data set JD2 is actually entered by a user of the communication terminal 1 via the user interface 10. Such a data set JD2 corresponds, for example, to the PIN code associated with the payment card 4 connected to the card reader 21. Step E10 occurs during the phase PH1 so that the entry of the data set JD2 is masked among the emulated entries of the data sets JD1.

Upon receiving the data set JD2, the module 11 for processing the entered data encrypts the data set JD2 using the encryption table TC in a step E8.

The encrypted data set CJD2 is then transmitted to the secure processing module 20 in a step E12.

In a step E13, the secure processing module 20 decrypts the various data sets CJD1 and CJD2 received.

In a step E14, the secure processing module 20 identifies the data set JD2 from among all of the decrypted data sets. This is possible because the secure processing module 20 has generated the data sets JD1 whose entry is intended to be emulated by the user interface 10. Once the data set JD2 has been identified, it is processed by the secure processing module 20. When the data set JD2 matches the PIN code of the payment card 4 that has established a connection with the payment card reading module 21, the secure data processing device 20 can access sensitive data stored in a memory of the payment card 4.

In a step E15, after accessing the contents of the memory of the payment card 4, the secure processing module 20 transmits a message MSG5 to the module 11 for processing the entered data comprising parameters for establishing a communication session with a processing server ST, such as a payment server. The parameters comprised in the message MSG5 can be encrypted to guarantee the confidentiality thereof.

In a step E16, the module 11 for processing the entered data establishes a secure communication session with the processing server ST, for example, to carry out a payment transaction using the payment card 4.

In a step E17, an acknowledgement message ACK can be transmitted from the processing server ST to the secure processing module 20 and relayed by the module 11 for processing the entered data.

In one embodiment of the method of the invention, the phase PH1 can end once the data set JD2 has been decrypted and identified by the secure data processing module 20.

In another embodiment of the invention, the phase PH1 has a fixed duration. If, after this duration has expired, the data set JD2 has not actually been entered via the user interface 10, an error message can be displayed via the graphical user interface 10 asking the user of the communication terminal to reconnect the payment card 4 with the card reading module 21, for example.

FIG. 3 shows a piece of communication equipment 1 according to one embodiment of the invention.

The communication equipment 1 can comprise at least one hardware processor 101, a storage unit 102, an entry device 103, a display device 104, an interface 105, at least one network interface 106 and a module 11 for processing the entered data, which are connected to one another via a bus 107. It goes without saying that the component elements of the communication equipment 1 can be connected by means of a connection that is different from a bus.

The processor 101 controls the operations of the communication equipment 1. The storage unit 102 stores at least one program for implementing a method for securely transmitting data according to one embodiment of the invention and, in the event that the communication equipment is embedded in a payment terminal, at least one program for the execution of payment transactions, to be executed by the processor 101, and various data, such as parameters used for computations carried out by the processor 101, and intermediate data for computations carried out by the processor 101, etc. The processor 101 can be formed by any known and suitable hardware or software, or by a combination of hardware and software. For example, the processor 101 can be formed by dedicated hardware such as a processing circuit, or by a programmable processing unit such as a central processing unit that executes a program stored in a memory thereof.

The storage unit 102 can be formed by any suitable means capable of storing the one or more programs and data in a computer-readable manner. Examples of a storage unit 102 include computer-readable non-transitory storage media such as solid-state memory devices and magnetic, optical or magneto-optical recording media loaded on a read/write unit.

The entry device 103 can be formed by a keyboard, or a pointing device such as a mouse to be used by a user to enter commands. The display device 104 can also be formed by a display module, such as a graphical user interface or GUI. The entry device 103 and the display device 104 constitute the user interface 10 and can be integrally formed by a touch screen, for example.

The interface 105 provides an interface between the communication equipment 1 and an external appliance such as the secure data processing device 2. The interface 105 can communicate with the external appliance via a wired or wireless connection.

At least one network interface 106 provides a connection between the communication equipment 1 and a remote piece of equipment, such as the processing server ST, via a communication network, such as the Internet. The network interface 106 can provide, depending on the nature thereof, a wired or wireless connection to the network.

The module 11 for processing the entered data is controlled by the processor 101 in accordance with the instructions of the program for implementing a secure transmission method according to one embodiment of the invention. The module 11 for processing the entered data can be a software module or a combination of hardware and software.

FIG. 4 shows a secure data processing device 2 according to one embodiment of the invention.

The secure data processing device 2 can comprise at least a hardware processor 201, a storage unit 202, a secure data processing module 20, a reading module 21 for reading a payment card 4, and an interface 203 which are connected to one another via a bus 204. It goes without saying that the component elements of the secure data processing device 2 can be connected by means of a connection that is different from a bus.

The processor 201 controls the operations of the secure data processing device 2. The storage unit 202 stores at least one program for implementing a method for protecting data entered according to one embodiment of the invention and, in the event that the secure data processing device 2 is embedded in a payment terminal, at least one program for the execution of payment transactions, to be executed by the processor 201, and various data, such as parameters used for computations carried out by the processor 201, and intermediate data of computations carried out by the processor 101, etc. The processor 201 can be formed by any known and suitable hardware or software, or by a combination of hardware and software. For example, the processor 201 can be formed by dedicated hardware such as a processing circuit, or by a programmable processing unit such as a central processing unit that executes a program stored in a memory thereof.

The storage unit 202 can be formed by any suitable means capable of storing the one or more programs and data in a computer-readable manner. Examples of a storage unit 202 include computer-readable non-transitory storage media such as solid-state memory devices and magnetic, optical or magneto-optical recording media loaded on a read/write unit.

The interface 203 provides an interface between the secure data processing device 2 and an external appliance such as the communication equipment 1. The interface 203 can communicate with the external appliance via a wired or wireless connection.

The secure data processing module 20 is controlled by the processor 201 in accordance with the instructions of the program for implementing a method for protecting the data entered according to one embodiment of the invention. The secure data processing module 20 can be a software module or a combination of hardware and software.

The invention claimed is:

1. A protection method for protecting data entered via a user interface of a communication terminal comprising a module for processing the data entered via the user interface, the method being implemented by a secure data processing device and comprising:
    transmitting, via a secure connection connecting the secure data processing device and the communication terminal, an encryption table to the module for processing the entered data, said encryption table being configured to be used by the module for processing the data entered to encrypt data entered via the user interface;
    masking the data entered via the user interface comprising repeating, a limited number of times, steps of
    transmitting to the user interface a second data set, the entry thereof to be emulated by the user interface; and
    implementing a phase of receiving from the module for processing the data of said second data set encrypted using said encryption table, the data of a first data set, actually entered via the user interface and encrypted using said encryption table, are received during the masking;
    decrypting the first data set and at least one of received second data sets, wherein the phase of transmitting said plurality of second data sets is stopped once the first data set has been decrypted; and identifying the first data set from among all of the decrypted data sets using the second data sets transmitted to the user interface.

2. The protection method according to claim 1, further comprising transmitting a new encryption table to said module processing the entered data prior to each phase of transmitting said plurality of second data sets.

3. The protection method according to claim 1, further comprising the processing module determining the content to be displayed by the user interface for data entry.

4. The protection method according to claim 1, further comprising the processing module communicating with at least one secure device using the data of the first data set.

5. The protection method according to claim 4, wherein the secure device is a payment card and the data of the first data set are a PIN code associated with said payment card.

6. A device for securely processing data entered via a user interface of a communication terminal comprising a module for processing the data entered via the user interface, the device comprising at least one processor configured to:
   transmit, via a secure connection connecting the secure data processing device and the communication terminal, an encryption table to the module for processing the entered data, said encryption table being configured to be used by the module for processing the data entered to encrypt data entered via the user interface;
   mask the data entered via the user interface comprising repeating, a limited number of times, steps of:
   transmit to the user interface a second data set, the entry thereof to be emulated by the user interface; and
   receive from the module for processing the data of said second data set encrypted using said encryption table, the data of a first data set, actually entered via the user interface and encrypted using said encryption table, are received during the masking of the data entered;
   decrypt the first data set and at least one of the received second data sets, wherein the phase of transmitting said plurality of second data sets is stopped once the first data set has been decrypted; and
   identify the first data set from among all of the decrypted data sets using the second data sets transmitted to the user interface.

7. A non-transitory computer-readable medium comprising a computer program product stored thereon comprising program code instructions for implementing a data protection method when the instructions are executed by a processor of a secure data processing device, wherein the instructions configure the secure data processing device to protect data entered via a user interface of a communication terminal comprising a module for processing the data entered via the user interface by:
   transmitting, via a secure connection connecting the secure data processing device and the communication terminal, an encryption table to the module for processing the entered data, said encryption table being configured to be used by the module for processing the data entered to encrypt data entered via the user interface;
   masking the data entered via the user interface comprising repeating, a limited number of times, steps of transmitting to the user interface a second data set, the entry thereof to be emulated by the user interface; and
   implementing a phase of receiving from the module for processing the data of said second data set encrypted using said encryption table, the data of a first data set, actually entered via the user interface and encrypted using said encryption table, are received during the masking;
   decrypting the first data set and at least one of the received second data sets, wherein the phase of transmitting said plurality of second data sets is stopped once the first data set has been decrypted; and
   identifying the first data set from among all of the decrypted data sets using the second data sets transmitted to the user interface.

* * * * *